United States Patent
Corrigan et al.

(10) Patent No.: US 8,599,353 B2
(45) Date of Patent: Dec. 3, 2013

(54) DISPLAY COMPRISING A PLURALITY OF SUBSTRATES AND A PLURALITY OF DISPLAY MATERIALS DISPOSED BETWEEN THE PLURALITY OF SUBSTRATES THAT ARE CONNECTED TO A PLURALITY OF NON-OVERLAPPING INTEGRAL CONDUCTIVE TABS

(75) Inventors: Thomas R. Corrigan, Saint Paul, MN (US); Patrick M. Campbell, Saint Paul, MN (US); Dennis M. Brunner, Centralia, MO (US)

(73) Assignee: 3M Innovative Properties Company, Saint Paul, MN (US)

( * ) Notice: Subject to any disclaimer, the term of this patent is extended or adjusted under 35 U.S.C. 154(b) by 110 days.

(21) Appl. No.: 13/114,362

(22) Filed: May 24, 2011

(65) Prior Publication Data
US 2011/0292323 A1   Dec. 1, 2011

Related U.S. Application Data

(60) Provisional application No. 61/349,239, filed on May 28, 2010.

(51) Int. Cl.
*G02F 1/1345* (2006.01)

(52) U.S. Cl.
USPC .......................................... 349/149; 349/152

(58) Field of Classification Search
USPC .......................................... 349/150–152, 149
See application file for complete search history.

(56) References Cited

U.S. PATENT DOCUMENTS

| | | | |
|---|---|---|---|
| 5,742,074 A | 4/1998 | Takizawa | |
| 6,297,519 B1 | 10/2001 | Fujikawa | |
| 6,476,881 B2 | 11/2002 | Ozaki | |
| 6,480,255 B2 | 11/2002 | Hoshino | |
| 6,501,525 B2 | 12/2002 | Huang | |
| 6,509,215 B2 | 1/2003 | Fujikawa | |
| 6,876,422 B2 | 4/2005 | Ishiwa | |
| 6,897,919 B2 | 5/2005 | Enomoto | |
| 6,900,876 B2 | 5/2005 | Stephenson | |
| 7,576,736 B2 | 8/2009 | Yeh | |
| 7,593,017 B2 | 9/2009 | Thielen | |
| 7,648,645 B2 | 1/2010 | Roberts | |
| 7,855,705 B2 | 12/2010 | Nirmal | |
| 7,929,106 B2 | 4/2011 | Roberts | |
| 8,034,254 B2 | 10/2011 | Sherman | |
| 8,089,604 B2 | 1/2012 | Wardhana | |
| 8,217,930 B2 | 7/2012 | Campbell | |
| 2007/0063939 A1* | 3/2007 | Bellamy | 345/87 |
| 2007/0177092 A1* | 8/2007 | Hosoya | 349/149 |
| 2009/0316060 A1 | 12/2009 | Nirmal | |
| 2010/0073405 A1 | 3/2010 | Campbell | |
| 2011/0170037 A1 | 7/2011 | Nirmal | |

FOREIGN PATENT DOCUMENTS

| | | | | |
|---|---|---|---|---|
| JP | 2001-343916 | 12/2001 | | |
| JP | 2002-169490 | 6/2002 | | |
| JP | 2002169490 A * | 6/2002 | | G09F 9/46 |
| JP | 2004-004924 | 1/2004 | | |

(Continued)

*Primary Examiner* — Paul Lee

(57) ABSTRACT

The present disclosure generally relates to multilayer display connections, display devices using the display connections, and tiled displays, in particular tiled reflective cholesteric liquid crystal displays. The displays include substrates that have integral tabs for bringing the electrical connections from one major surface of the display to the opposite major surface of the display. The inactive region of a tiled display is thereby minimized by making the electrical connections to display drivers on the major surface opposite the viewing area.

9 Claims, 8 Drawing Sheets

(56) References Cited

FOREIGN PATENT DOCUMENTS

| | | |
|---|---|---|
| JP | 2004-118164 | 4/2004 |
| JP | 4227622 | 2/2009 |
| JP | 2009-063963 | 3/2009 |
| JP | 2009-086115 | 4/2009 |
| JP | 2009-158833 | 7/2009 |
| WO | WO 2009-079249 | 6/2009 |

* cited by examiner

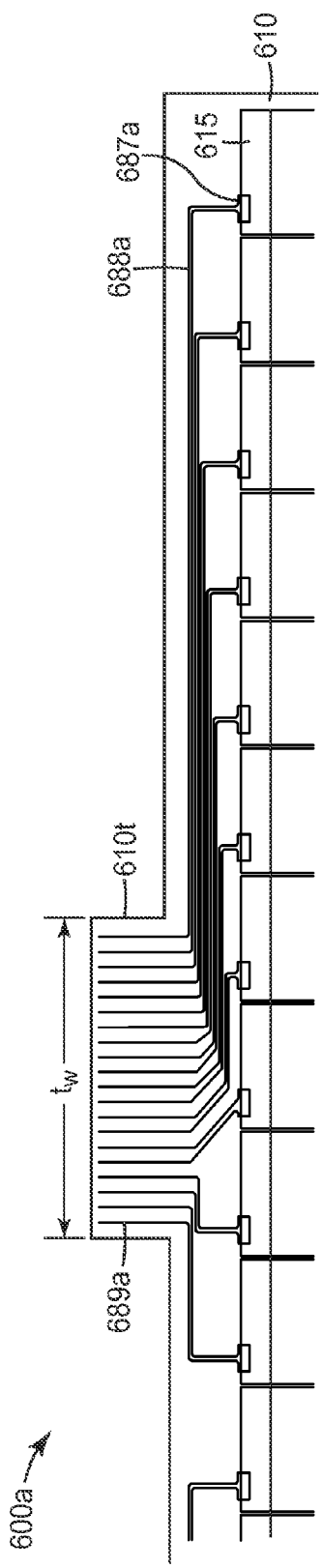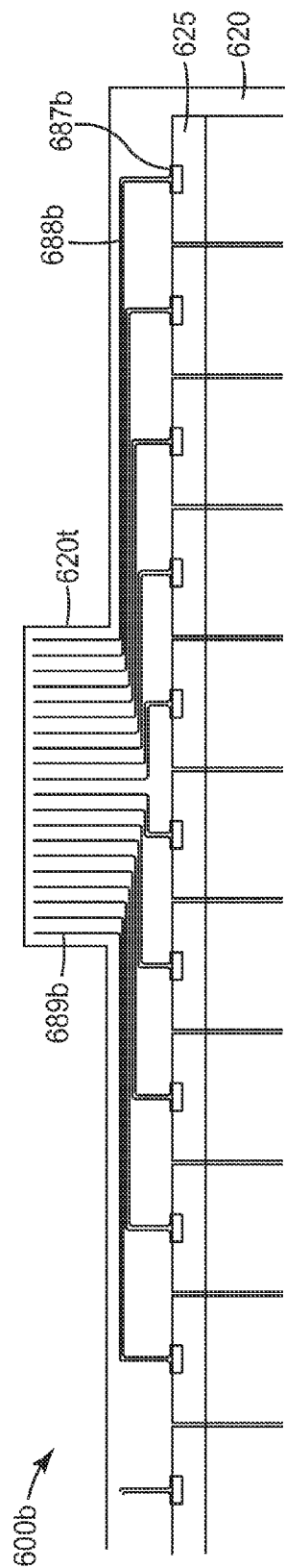

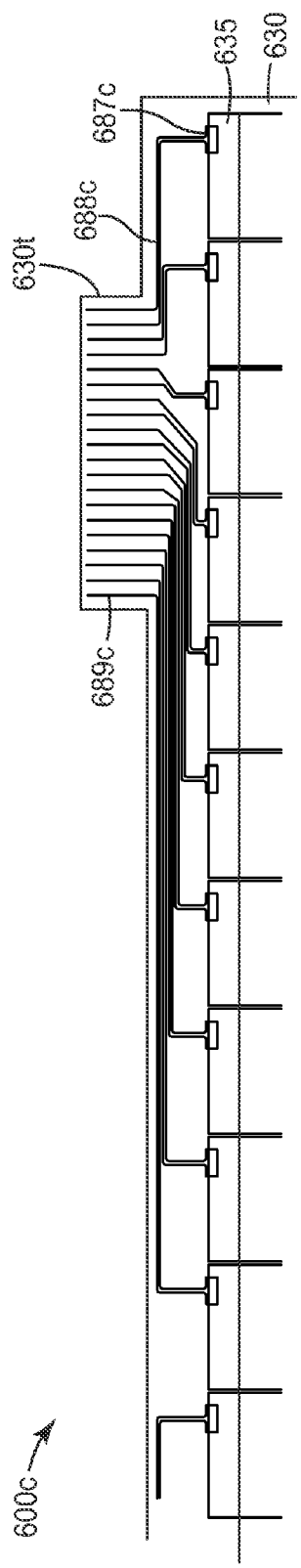
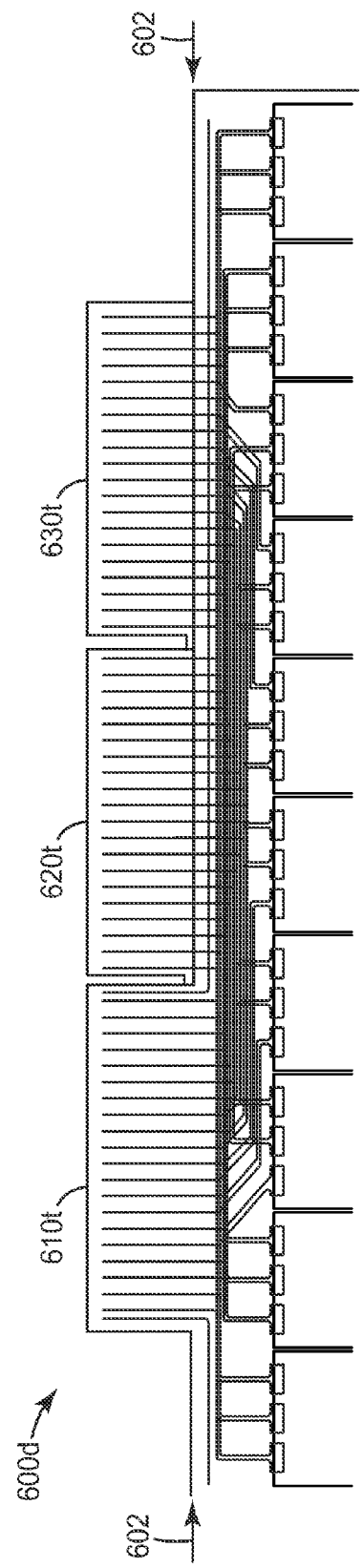

DISPLAY COMPRISING A PLURALITY OF SUBSTRATES AND A PLURALITY OF DISPLAY MATERIALS DISPOSED BETWEEN THE PLURALITY OF SUBSTRATES THAT ARE CONNECTED TO A PLURALITY OF NON-OVERLAPPING INTEGRAL CONDUCTIVE TABS

CROSS REFERENCE TO RELATED APPLICATION

This application claims the benefit of U.S. Provisional Patent Application No. 61/349,239, filed May 28, 2010, the disclosure of which is incorporated by reference herein in its entirety.

BACKGROUND

Multilayer displays can include cholesteric liquid crystal (ChLC) materials that consist of a nematic liquid crystal and a chiral additive blended together to spontaneously form a helical structure with a well defined pitch. This pitch determines the wavelength of light reflected by the material and hence the color of it. The color can also be adjusted by varying the ratio of the nematic liquid crystal and chiral components. A pixel in a ChLC display can be switched between its planar reflective (colored) state and its semi-transparent focal conic state by application of an appropriate drive scheme.

SUMMARY

This disclosure generally relates to multilayer display connections, display devices using the display connections, and tiled displays, in particular tiled reflective cholesteric liquid crystal displays. In one aspect, a display includes a first substrate having a first integral tab and a plurality of first transparent row conductors extending to the first integral tab, and a second substrate having a second integral tab and a plurality of first transparent column conductors extending to the second integral tab, the plurality of first transparent column conductors disposed facing the plurality of first transparent row conductors. The display further includes a first display material disposed between the first substrate and the second substrate. The display still further includes a plurality of first malleable conductors disposed on the first integral tab, forming a one-to-one electrical contact with the plurality of first transparent row conductors, and a plurality of second malleable conductors disposed on the second integral tab, forming a one-to-one electrical contact with the plurality of first transparent column conductors. The first substrate is disposed on a first major surface of a display support, the first and the second integral tabs capable of being bent to an opposing second major surface of the display support.

In another aspect, the present disclosure provides a display that includes a display support having disposed on a first major surface thereon a first display material separating a first pair of opposing electrodes, the first pair of opposing electrodes disposed on substrates that include first electrical connection tabs extending beyond an active region of the display. The display further includes a second display material separating a second pair of opposing electrodes, the second pair of opposing electrodes disposed on substrates that include second electrical connection tabs extending beyond the active region of the display. The display still further includes a third display material separating a third pair of opposing electrodes, the third pair of opposing electrodes disposed on substrates that include third electrical connection tabs extending beyond the active region of the display, Each of the electrodes include a plurality of transparent or semitransparent conductors, each of the electrical connection tabs include a plurality of malleable conductors, and each of the electrical connection tabs are bent to an opposing second major surface of the display support.

In yet another aspect, the present disclosure provides a method of making a display that includes providing a display support; forming a first substrate having a first active region and a first integral tab, and disposing a plurality of first transparent row conductors on the first active region, the plurality of first transparent row conductors extending to the first integral tab. The method further includes disposing a plurality of malleable row conductors on the first integral tab, forming a one-to-one electrical contact with the plurality of first transparent row conductors, and disposing the first substrate on the display support such that the plurality of transparent row conductors is opposite the display support. The method still further includes disposing a first display material on the first transparent row conductors; forming a second substrate having a second active region and a second integral tab; and disposing a plurality of first transparent column conductors on the second active region, the plurality of first transparent column conductors extending to the second integral tab. The method still further includes disposing a plurality of malleable column conductors on the second integral tab, forming a one-to-one electrical contact with the plurality of first transparent column conductors; disposing the second substrate such that the first transparent column conductors overlay the first display material, the first active region overlays the second active region, and each of the first integral tab and the second integral tab are on adjacent sides of the active region; and bending the first integral tab and the second integral tab around adjacent edges of the support.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIGS. 6A-6D shows top-view schematic of layers in a display device.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Generally, the present disclosure relates to display devices, and techniques that enable tiling of individual display devices together to make a larger display such as a sign or a billboard. The displays can be any display capable of presenting or conveying information, such as, for example, a Liquid Crystal Display (LCD), an Organic Light Emitting Diode (OLED) display, an electrochromic display, an electrophoretic display, a Cholesteric Liquid Crystal (ChLC) display, a touch-sensitive display, and the like. In particular, the present disclosure can be advantageously applied to large tiled ChLC displays, which are described elsewhere.

In general, as used herein, the term "display material" refers to any type of material activated by an electrode in a display device. In some cases, a display device includes both row and column orthogonal conductive layers that can be energized to activate a pixel associated with the intersection of the respective row and column conductive layer. Each of these conductive layers is typically transparent or semi-transparent, to facilitate the transmission of light through the display.

Unlike a conventional nematic liquid crystal (NLC) based display, a ChLC display does not require polarizers or color filters, resulting in a simpler device construction at a potentially lower cost. In a full color NLC display, the red-green-blue (RGB) subpixels are arranged side by side. As a result, only one third of the viewing area is occupied by each of the individual RGB primaries. On the other hand, each ChLC RGB subpixel reflects a single primary color while transmitting the other two, and each subpixel can then be positioned in a stack, overlaying each other, such that the viewing area is maximized. In one particular embodiment, a ChLC display can include any desired number of colors (subpixels) without substantially decreasing the viewing area.

Figure 1:
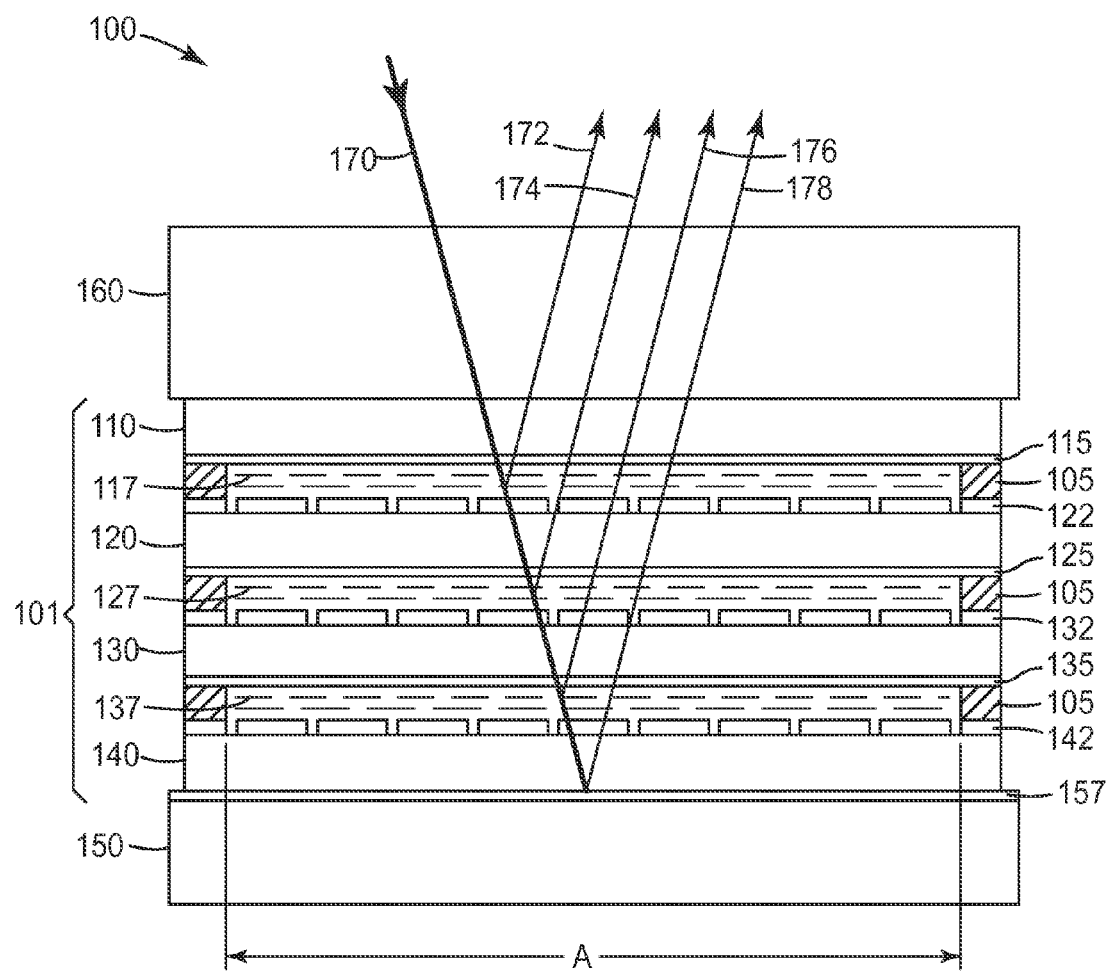
FIG. 1 shows a cross-section schematic of a display device.

FIG. 1 shows a cross-section schematic of a display device 100, such as a four color ChLC display device, according to one aspect of the disclosure. Display device 100 includes a support substrate 150, a cover substrate 160, and a display stack 101 between them. The support substrate 150 can be any rigid or semi-rigid support including, for example, a polymeric plate, a composite plate, or a metal plate such as an aluminum plate. Generally, the support substrate 150 does not need to be visible-light transparent. The cover substrate 160 includes a rigid or semi-rigid visible light transparent material such as a plastic, a composite, or glass. The cover substrate 160 provides environmental protection to the display stack 101, and as such, glass can be a preferred cover substrate 160.

The display stack 101 includes a first substrate 110 disposed adjacent the cover substrate 160 and a second substrate 120 disposed separated from the first substrate 110 by a first ChLC material 117. The first substrate 110 includes a first plurality of row conductors 115, and the second substrate 120 includes a first plurality of column conductors 122 facing the plurality of first row conductors 115. The first ChLC material 117 is constrained between the first plurality of row conductors 115 and the first plurality of column conductors 122, within an active area "A" of the display device 100, by an edge seal 105.

In a similar manner, the display stack 101 further includes a third substrate 130 disposed separated from the second substrate 120 by a second ChLC material 127. The second substrate 120 further includes a second plurality of row conductors 125 disposed on a side opposite the first plurality of column conductors 122, and the third substrate 130 includes a second plurality of column conductors 132 facing the second plurality of row conductors 125. The second ChLC material 127 is constrained between the second plurality of row conductors 125 and the second plurality of column conductors 132 within the active area "A" of the display device 100 by an edge seal 105.

In a similar manner, the display stack 101 further includes a fourth substrate 140 disposed separated from the third substrate 130 by a third ChLC material 137. The third substrate 130 further includes a third plurality of row conductors 135 disposed on a side opposite the second plurality of column conductors 132, and the fourth substrate 140 includes a plurality of third column conductors 142 facing the third plurality of row conductors 135. The third ChLC material 137 is constrained between the third plurality of row conductors 135 and the third plurality of column conductors 142 within the active area "A" of the display device 100 by an edge seal 105. Fourth substrate 140 is disposed adjacent support substrate 150, and an optional coating 157 can be disposed between them.

An incident light ray 170 passes through cover substrate 160 and can be reflected or transmitted by the various layers in the reflective stack, depending on the presence or absence of an appropriate electrical signal applied to a row and a column conductor. A full color ChLC display can be constructed by stacking a set of RGB panels with the individual RGB subpixels overlapped on top of each other and reflecting different regions of the spectrum. The support substrate 150 can be coated with an optional coating 157 (e.g., a broadband absorber that absorbs the light not reflected by the preceding layers). Black absorbers can include, for example, KRYLON matte or glossy black acrylic enamel spray paint.

In one particular embodiment, the first ChLC material 117 can be a blue light reflecting material, the second ChLC material 127 can be a green light reflecting material, the third ChLC material 137 can be a red light reflecting material, and the optional coating 157 can be an absorbing (i.e., black) material. In this embodiment, a first reflection 172 from the first ChLC material 117 results in a blue displayed color, a second reflection 174 from the second ChLC material 127 results in a green displayed color, a third reflection 176 from the third ChLC material 137 results in a red displayed color, and a fourth reflection 178 from the optional coating 157 does not occur, since the optional coating 157 is an absorbing material. In one particular embodiment, the optional coating 157 can instead be a material that reflects a wavelength spectrum that can be transmitted by the previous layers, for example, an infrared wavelength. In one particular embodiment, any number of layers (e.g., up to 6 layers or more) of ChLC material can be used in display stack 101, such that a broader range of addressable colors can be displayed, as would be readily understood by one of skill in the art.

Each of the conductive layers (i.e., row and column conductors) can include a transparent conductive oxide (TCO) layer as known to one of skill in the art. Transparent Conducting Oxides include the following exemplary materials: Indium Tin Oxide; Indium Zinc Oxide; Cadmium Oxide; $Zn_2SnO_4$; $ZnSnO_3$; $MgIn_2O_4$; $GaInO_3$; $(Ga,In)_2O_3$; $Zn_2In_2O_5$; $In_4Sn_3O_{12}$; $SnO_2$; and $In_2O_3$. Generally, TCO materials are relatively sensitive to deformations such as bending, and can readily fracture and lose conductivity.

Each of the substrates can be made using the following exemplary materials: glass; PET; PEN (polyethylene napthalate); PC (polycarbonate); PEEK (polyetheretherketone); PES (polyethersulphone); PAR (polyarylate); PI (polyimide); PMMA; PCO (polycyclic olefin); TAC (cellulose triacetate); and polyurethane.

Each subpixel in a ChLC display includes the ChLC material sandwiched between two conductive substrates. The subpixels may be bonded together using an optical adhesive.

Alternatively, the conductor may be coated and patterned on both sides of each substrate as shown, eliminating the optical adhesive layers. Red and yellow color filters may be included to improve color saturation and minimize color shifts with viewing angle. The observed color of each stacked pixel is determined by the sum of the reflections from each subpixel. The entire viewing area is utilized by the RGB primaries resulting in significantly improved brightness.

In its on (reflective) state, the light reflected by a pixel can include the ChLC planar reflection and unwanted Fresnel reflections at each interface due to refractive index mismatches. In one embodiment, conductors can be constructed to overcome these Fresnel reflections as described, for example, in co-pending U.S. Patent Application No. 2009/0316060 entitled "Conducting Film or Electrode with Improved Optical and Electrical Performance".

In one particular embodiment, the relative placement of row and column conductors associated with each of the first, second, and third ChLC material within display device 100 can be changed to accommodate different conductor patterning schemes. For example, although FIG. 1 shows the second substrate 120 as having a first plurality of column conductors 122 and a second plurality of row conductors 125 on opposing major surfaces of second substrate 120, it is to be understood that second substrate 120 can instead include row conductors on both surfaces, or alternatively column conductors on both surfaces. In some cases, fabrication of the patterned conductors on the substrate can be facilitated by having the plurality of conductors on opposing surfaces of the substrate running in the same direction. One of ordinary skill in the art would readily appreciate that all that is required is that each of the first, second, and third ChLC material be bounded by one plurality of column conductors and one plurality of row conductors.

Figure 2:
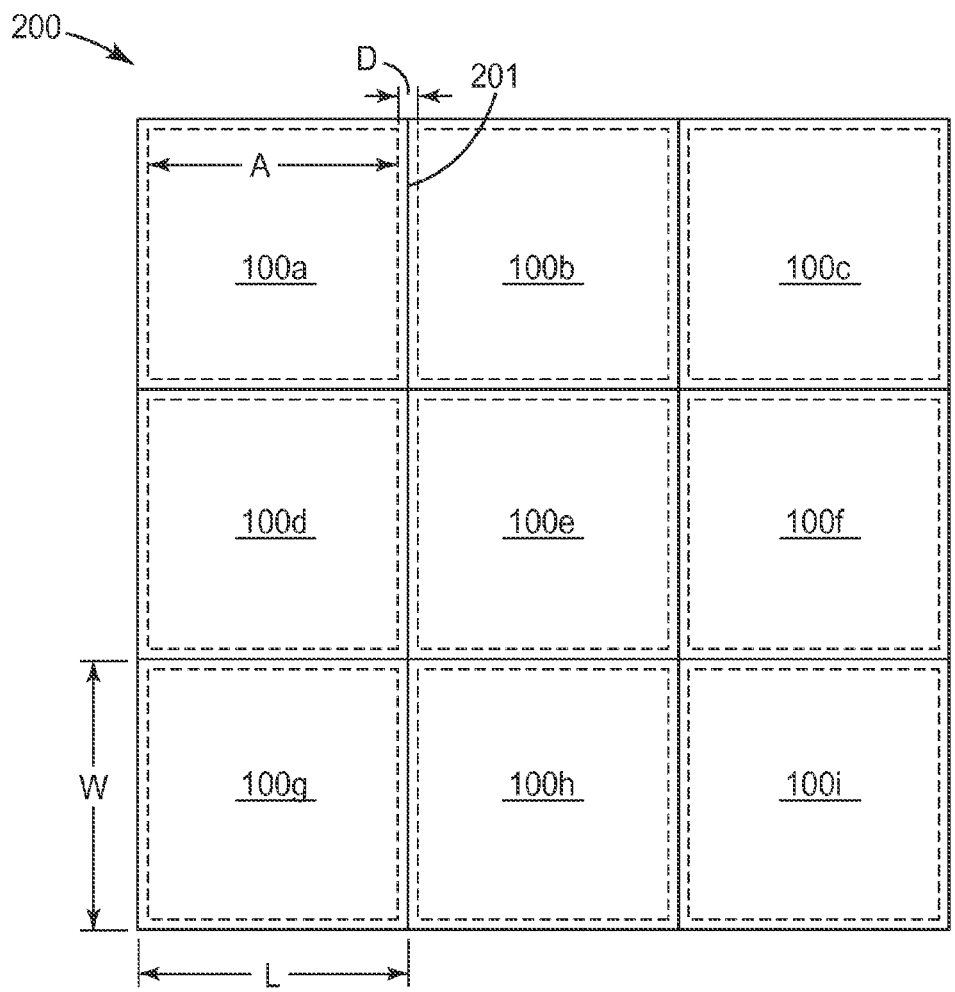
FIG. 2 shows a top-view schematic of a tiled display.

FIG. 2 shows a top-view schematic of a tiled display 200 according to one aspect of the disclosure. Generally, a tiled display such as tiled display 200 can include any number of display devices, and the display devices in the tiled display can be arranged in any desired pattern. In one particular embodiment, tiled display 200 includes a first through a ninth display device 100a-100i, respectively. Each of the first through ninth display device 100a-100i has a length "L" and a width "W", and are abutted adjacent each other along a common edge, such as edge 201 shown in FIG. 2. Each of the first through night display device 100a-100i further includes an active area "A" similar to the active area shown in FIG. 1. Adjacent active areas "A" are separated by an inactive region "D" where the display device edge seal 105 (shown in FIG. 1) and the conductors and electrodes (described elsewhere) are routed to display electronics (not shown). Generally, displays that minimize the inactive region "D" are preferred, and for at least this reason the electronic connections to the display drivers for each of the display devices 100a-100i are typically routed to the backside of the display.

Figure 3:
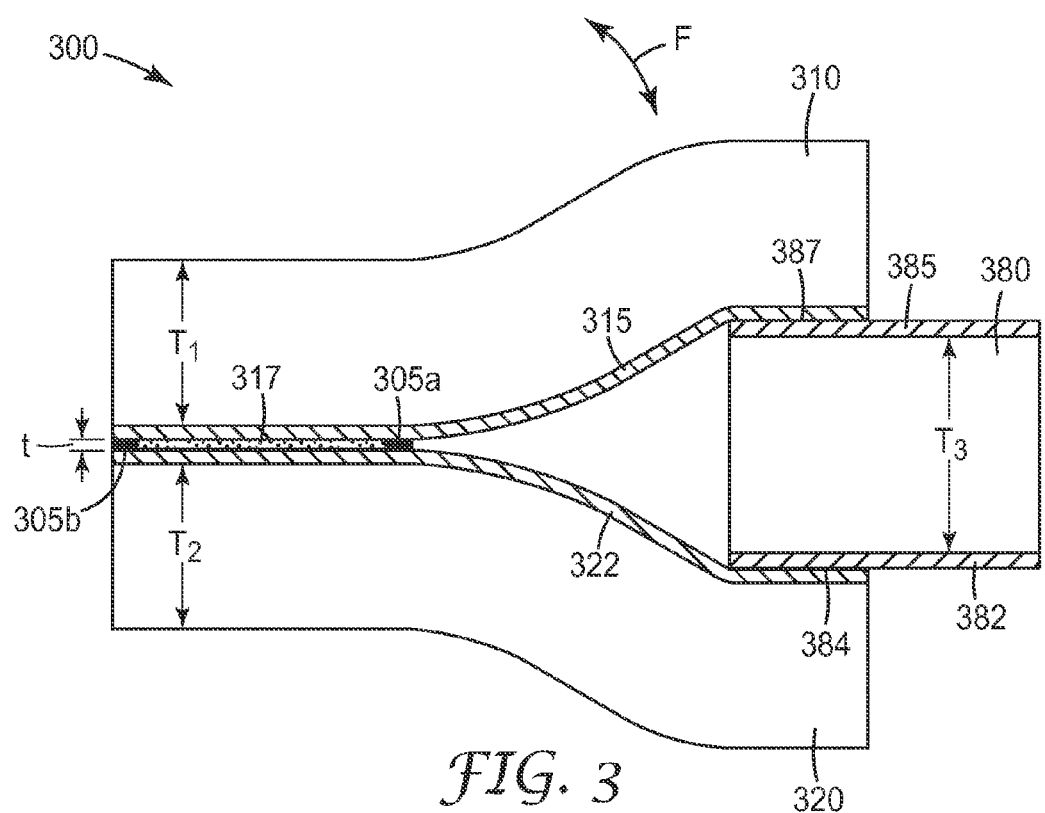
FIG. 3 shows a cross-section schematic of display element.

FIG. 3 shows a cross-section schematic of display element 300 that includes a technique for transitioning from fragile TCO conductors to malleable conductors that are capable of being bent to the backside of the display without an associated loss in conductivity. Malleable conductors typically include metals and metal alloys such as silver, silver alloys, aluminum and aluminum alloys. Display element 300 includes a first substrate 310 including a first conductor 315, a second substrate 320 including a second conductor 322, and a first ChLC material 317 between them. A first edge seal 305a and a second edge seal 305b serve to retain the first ChLC material 317 between the first and second conductors 315, 322. A thickness "t" of the first ChLC material 317 in a typical display application is generally less than about 10 microns, or less than about 5 microns, or even less than about 3 microns. In some cases, first conductor 315 can be a row conductor and second conductor 322 can be a column conductor, as described elsewhere Since first and second conductors 315, 322 comprise relatively fragile TCO materials; a transition substrate 380 that includes a malleable first conductor 385 and a malleable second conductor 382 can be used to bring the connections to the backside of a tiled display 200 as described elsewhere. Malleable first conductor 385 and malleable second conductor 382 make electrical contact with first and second conductors 315 and 322, at a first and a second bonding pad 384 and 387, respectively. Each of the first, second, and transition substrates 310, 320, and 380, respectively can be polymeric substrates described elsewhere, and the respective first, second, and third thickness T1, T2, T3, can range from about 100 microns to about 500 microns, for example, about 125 microns or about 250 microns thick. Due to the large difference in the separation of the first and second substrates 310, 320 in the vicinity of the ChLC material and in the vicinity of the transition substrate 380, stresses can accumulate near the first edge seal 305a, and can damage this seal rendering the display element 300 inoperative. In some cases, any force "F" applied while bending the transition substrate 380 can also be translated to damage the edge seal 305a, rendering the display element 300 inoperative.

Figure 4A:
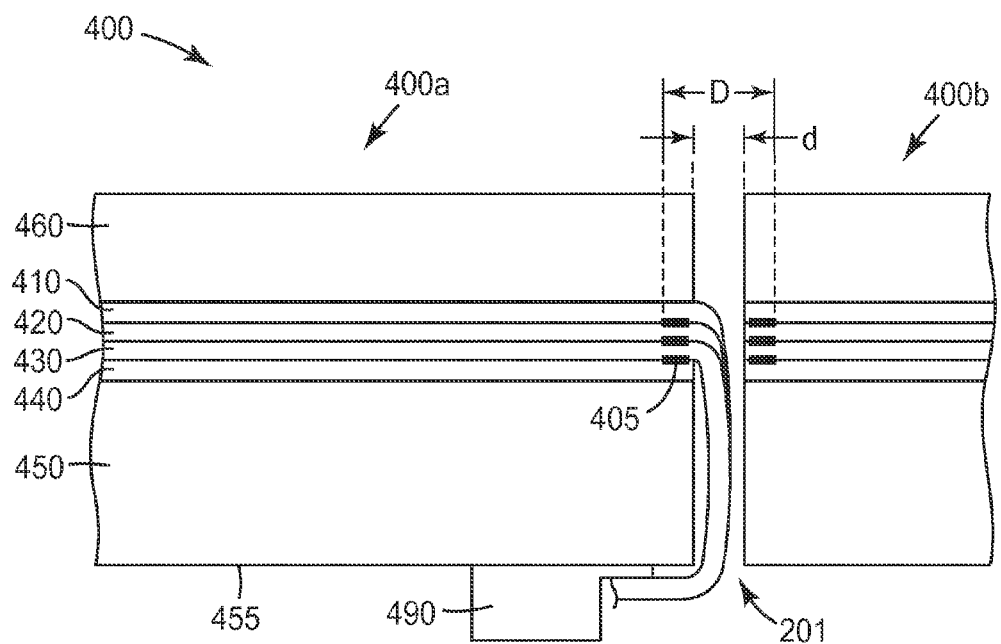
FIG. 4A shows a cross-section schematic of a tiled display device.

FIG. 4A shows a cross-section schematic of a tiled display device 400 including a first display device 400a abutting a second display device 400b, according to one aspect of the disclosure. FIG. 4A more clearly shows the edge 201 between two adjacent display elements in FIG. 2. First and second display devices 400a, 400b can be similar in construction, and for brevity only first display device 400a is described. First display device 400a includes support substrate 450, cover substrate 460, and first, second, third and fourth substrates 410, 420, 430, 440. Each of the elements 410-460 shown in FIG. 4A correspond to like-numbered elements 110-160 shown in FIG. 1, which have been described previously. For example, first substrate 410 of FIG. 4 corresponds to first substrate 110 of FIG. 1, and so on.

For clarity, intervening layers between adjacent substrates are omitted from FIG. 4: for example, first plurality of row conductors 115, first ChLC material 117, and first plurality of column conductors 122 disposed between first substrate 110 and second substrate 120 are not shown in FIG. 4; however, it is to be understood that these intervening layers are in first display device 400a and second display device 400b.

Figure 4B:
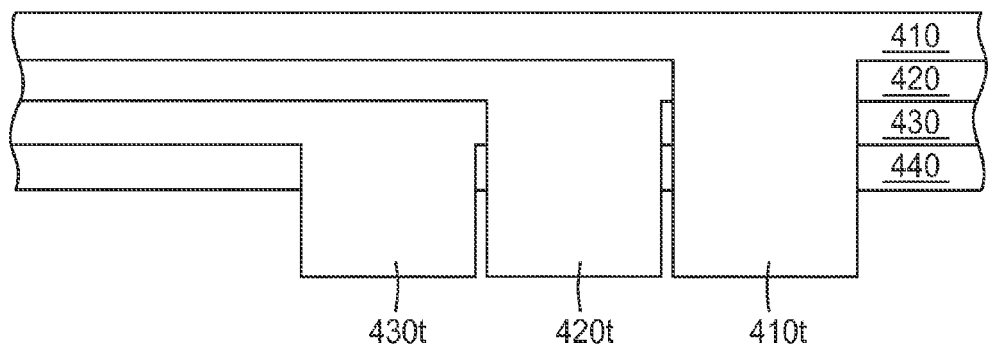
FIG. 4B shows an edge-view schematic of the tiled display device of FIG. 4A.

Each of the first, second, and third substrates 410, 420, 430 include at least one integral tab, such as a first through a third integral tab 410t, 420t, 430t, respectively, shown in FIG. 4B. In one particular embodiment, at least one of the first, second, third, and fourth substrates 410, 420, 430, 440 can include at least two integral tabs, each corresponding to row and column electrodes, as described elsewhere. Each of the first through third integral tabs 410t, 420t, and 430t, is in a region of the substrate that extends beyond the edge seal 405. FIG. 4B shows an edge-view schematic of the first display device 400a of FIG. 4A, along edge 201, according to one aspect of the disclosure. Each of the first, second, and third integral tabs 410t, 420t, and 430t are shown to be interleaved such that none of the integral tabs are overlapped. In the embodiment shown in FIGS. 4A and 4B, a fourth integral tab 440t (not shown) corresponds to an electrode orientation (such as a column electrode reference in FIG. 1), and as such appears on an edge perpendicular to edge 201.

The reduction in the inactive region "D" can be accomplished by making the electrical connections from the row and column conductors to drive circuitry 490 disposed on a back surface 455 of the display device. Each of the electrical connections on each integral tab is fabricated from a malleable material, as described elsewhere, so that the bending does not damage the fragile transparent conductors (typically TCO), as described elsewhere. Generally, the fragile TCO conductor is patterned on the substrate, and the malleable conductor is patterned on the same substrate to be in electrical contact with the TCO conductor. In this manner, no additional substrate thickness is required, eliminating the stresses described with reference to FIG. 3. A minimum separation "d" between adjacent panels is unavoidable, but in the limit, the separation "d" can be the thickness of a single substrate. Each of the integral tabs can be bent using a combination of heat and pressure, and sufficient clamping force can be applied in the region of the bend to limit the stresses placed on the fragile TCO conductors.

FIGS. 6A-6D shows top-view schematic of layers in a display device, such as the first display device 400a shown in FIG. 4A. Each of the elements 610-635 shown in FIGS. 6A-6D correspond to like-numbered elements 110-135 shown in FIG. 1, which have been described previously. For example, first substrate 610 of FIG. 6A corresponds to first substrate 110 of FIG. 1, and so on.

FIG. 6A shows a top-view schematic of a first layer 600a, according to one aspect of the disclosure. In FIG. 6A, first substrate 610 includes a first plurality of row conductors 615, a first plurality of malleable row conductors 688a, and a first plurality of tab malleable row conductors 689a disposed on first integral tab 610t. The first integral tab 610t has a width "$t_w$" that is substantially narrower than first substrate 610. Each of the first plurality of malleable row conductors 688a forms a one-to-one electrical contact with each of the first plurality of row conductors 687a, on a first plurality of contact pads 687a.

FIG. 6B shows a top-view schematic of a second layer 600b, according to one aspect of the disclosure. In FIG. 6B, second substrate 620 includes a second plurality of row conductors 625, a second plurality of malleable row conductors 688b, and a second plurality of tab malleable row conductors 689b disposed on second integral tab 620t. Each of the second plurality of malleable row conductors 688b forms a one-to-one electrical contact with each of the second plurality of row conductors 687b on a second plurality of contact pads 687b.

FIG. 6C shows a top-view schematic of a third layer 600c, according to one aspect of the disclosure. In FIG. 6C, third substrate 630 includes a third plurality of row conductors 635, a third plurality of malleable row conductors 688c, and a third plurality of tab malleable row conductors 689c disposed on third integral tab 630t. Each of the third plurality of malleable row conductors 688c forms a one-to-one electrical contact with each of the third plurality of row conductors 687c on a third plurality of contact pads 687c.

FIG. 6D shows a top-view schematic of a display element 600d that includes a laminate of the first, second, and third layers 600a, 600b, 600c of FIGS. 6A-6C, showing the interleaved first, second, and third integral tabs 610t, 620t, 630t, which can be bent along bend line 602 to enable connection on the back surface 455 to the drive circuitry 490 shown in FIG. 4A. It is to be understood that as the size of the display increases, any given layer may require more than one tab with associated conductors, in order to effectively group the conductor traces into narrower strips of malleable traces on the tabs.

Figure 5A:
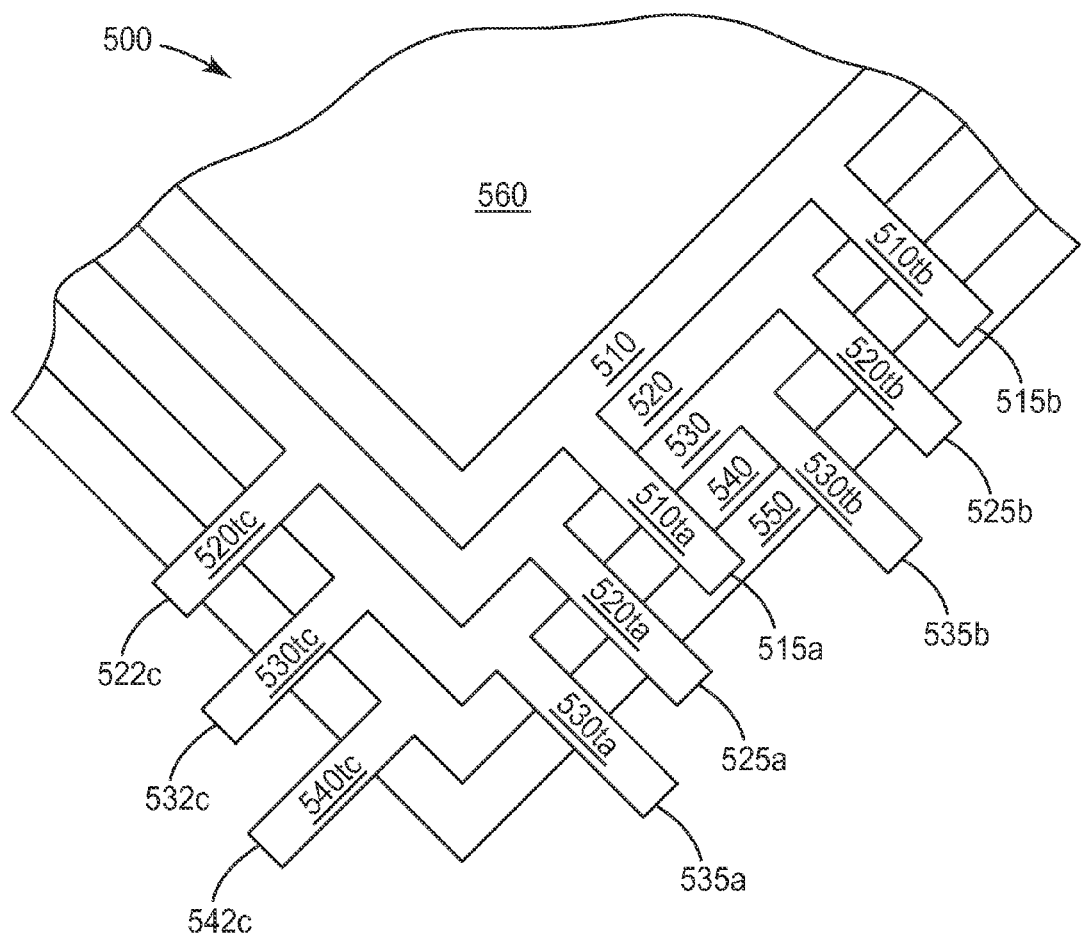
FIG. 5A shows an exploded perspective schematic of a display device.

FIG. 5A shows an exploded perspective schematic of a display device 500, according to one aspect of the disclosure. The display device 500 includes interleaved integral tabs for connection to display driver circuitry, and can be compared to the display device 100 shown in FIG. 1. Each of the elements 510-560 shown in FIG. 5A correspond to like-numbered elements 110-160 shown in FIG. 1, which have been described previously. For example, first substrate 510 of FIG. 5A corresponds to first substrate 110 of FIG. 1, and so on. For clarity, intervening layers between adjacent substrates are omitted from FIG. 5A: for example, first plurality of row conductors 115, first ChLC material 117, and first plurality of column conductors 122 disposed between first substrate 110 and second substrate 120 are not shown in FIG. 5A; however, it is to be understood that these intervening layers are also in display device 500.

In FIG. 5A, display device 500 includes first substrate 510 having two integral tabs 510ta and 510tb for first row connections, extending from an edge of the substrate. In this embodiment, more than one tab connected to the row conductors can be required due to the size of the display device 500. Comparison with FIG. 1 indicates that the first row malleable conductor traces 515a and 515b can be disposed on a surface of first substrate 510 that faces second substrate 520.

Second substrate 520 includes integral tab 520tc for first column connections, extending from an edge of the substrate. Comparison with FIG. 1 indicates that the first column malleable conductor traces 522c can be disposed on a surface of second substrate 520 that faces first substrate 510. Second substrate 520 further includes a pair of integral tabs 520ta and 520tb for second row connections, extending from an adjacent edge of the substrate. Comparison with FIG. 1 indicates that the second row malleable conductor traces 525a and 525b can be disposed on a surface of second substrate 520 that faces third substrate 530.

Third substrate 530 includes integral tab 530tc for second column connections, extending from an edge of the substrate. Comparison with FIG. 1 indicates that the second column malleable conductor traces 532c can be disposed on a surface of third substrate 530 that faces second substrate 520. Third substrate 530 further includes a pair of integral tabs 530ta and 530tb for third row connections, extending from an adjacent edge of the substrate. Comparison with FIG. 1 indicates that the third row malleable conductor traces 535a and 535b can be disposed on a surface of third substrate 530 that faces fourth substrate 540.

Fourth substrate 540 includes integral tab 540tc for third column connections, extending from an edge of the substrate. Comparison with FIG. 1 indicates that the third column malleable conductor traces 542c can be disposed on a surface of fourth substrate 540 that faces third substrate 530. Fourth substrate 540 is supported by support substrate 550 which may include an optional absorptive or reflective coating, as described elsewhere.

Figure 5B:
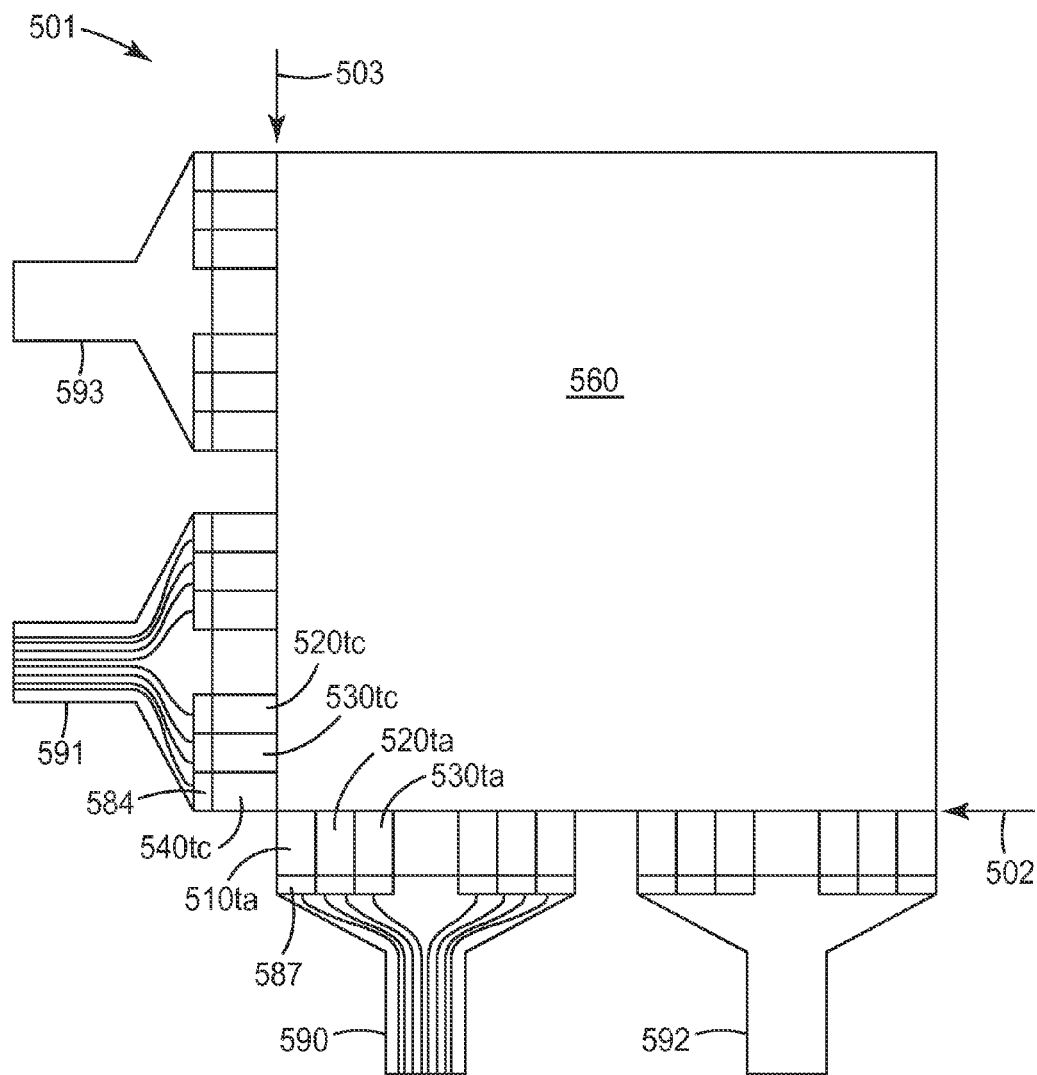
FIG. 5B shows a top view schematic of a display device.

FIG. 5B shows a top view schematic of a display device 501, according to one aspect of the disclosure. In one particular embodiment, FIG. 5B is a modification of the integral tab connectors of the display device 500 of FIG. 5A, to reduce the number of connections needed to be made to the backside of the support substrate, as shown in FIG. 4A. In FIG. 5B, each of the interleaved tabs (e.g., representative integral tabs 510ta, 520ta, 530ta; and representative integral tabs 520tc, 530tc, 540tc) are electrically connected at connections 597 to a first combined row tab 590, a second combined row tab 592, a first combined column tab 591 and a second combined column tab 593. Each of the first and second combined row tabs 590, 592, and each of the first and second combined column tabs 591, 593, can be bent along a first or a second edge 502, 503, respectively, to provide contact to the backside of the display, as described elsewhere.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A display, comprising:
   a first substrate having a first integral tab and a plurality of first transparent row conductors extending to the first integral tab;
   a second substrate having a second integral tab and a plurality of first transparent column conductors extending to the second integral tab, the plurality of first transparent column conductors disposed facing the plurality of first transparent row conductors;
   a first display material disposed between the first substrate and the second substrate;
   a plurality of first malleable conductors disposed on the first integral tab, forming a one-to-one electrical contact with the plurality of first transparent row conductors;
   a plurality of second malleable conductors disposed on the second integral tab, forming a one-to-one electrical contact with the plurality of first transparent column conductors,
   wherein the first substrate is disposed on a first major surface of a display support, the first and the second integral tabs capable of being bent to an opposing second major surface of the display support;
   a plurality of second transparent row conductors disposed on an opposing major surface of the second substrate, and extending to a third integral tab;
   a third substrate having a fourth integral tab and a plurality of second transparent column conductors extending to the fourth integral tab, the plurality of second transparent column conductors disposed facing the plurality of second transparent row conductors;
   a second display material disposed between the second substrate and the third substrate;
   a plurality of third malleable conductors disposed on the third integral tab, forming a one-to-one electrical contact with the plurality of second transparent row conductors; and
   a plurality of fourth malleable conductors disposed on the fourth integral tab, forming a one-to-one electrical contact with the plurality of second transparent column conductors,
   wherein the third integral tab and the fourth integral tab each extends from the first edge or an opposite third edge of a viewable display region, and further wherein none of the first integral tab, the second integral tab, the third integral tab, and the fourth integral tabs overlap.

2. The display of claim 1, wherein the first and the second integral tabs extend from a first edge and an adjacent second edge of the viewable display region.

3. The display of claim 1, wherein the first display material is a first cholesteric liquid crystal material.

4. The display of claim 1, wherein at least one of the third integral tab and the fourth integral tab is capable of being bent to the opposite second major surface of the display support.

5. The display of claim 1, wherein the second display material is a second cholesteric liquid crystal material.

6. The display of claim 1, wherein each transparent conductor comprises a transparent conductive oxide.

7. The display of claim 1, wherein each malleable conductor comprises a metal or a metal alloy.

8. The display of claim 7, wherein the metal or the metal alloy comprises silver.

9. The display of claim 1, wherein each substrate comprises polyethylene terephthalate (PET).

* * * * *